United States Patent [19]

Kadron et al.

[15] 3,736,515

[45] May 29, 1973

[54] NON-LINEAR FUNCTION GENERATOR

[75] Inventors: Don G. Kadron, Pasadena; Wallace J. Hoff; Robert L. Parks, both of Ellicott City, all of Md.

[73] Assignee: Westinghouse Electric Corporation, Pittsburgh, Pa.

[22] Filed: Feb. 11, 1971

[21] Appl. No.: 114,530

[52] U.S. Cl. ....................328/143, 307/229, 328/145

[51] Int. Cl. ............................................G06g 17/12

[58] Field of Search ......307/229, 230; 328/142, 143, 328/145

[56] References Cited

UNITED STATES PATENTS 3,579,127 5/1971 Thomas .................307/229 X 3,550,020 12/1970 Gill et al. ...............307/229 X

*Primary Examiner*—John S. Heyman

*Assistant Examiner*—B. P. Davis

*Attorney*—F. H. Henson, E. P. Klipfel and S. Weinberg

[57] ABSTRACT

A circuit providing for the segmented approximation of non-linear analog function. One input of each of a plurality of operational amplifiers receive a variable analog signal. Each of the operational amplifiers receives at its other input a reference voltage. Diodes are connected in various feedback paths between the output and one of the inputs of the operational amplifier. The output derived from each operational amplifier will depend upon the relationship between the variable input voltage and the reference voltage and how they combine to affect the diodes.

4 Claims, 10 Drawing Figures

WITNESSES
Theodore F. Wrobel
James F. Young

INVENTORS
Wallace J. Hoff, Robert L. Parks
and Don G. Kadron
BY Stanley Weinberg
ATTORNEY

NON-LINEAR FUNCTION GENERATOR

The invention herein described was made in the course of or under a contract or subcontract thereunder with the Department of Defense.

CROSS REFERENCE TO RELATED APPLICATION

This application is related to application Ser. No. 114,524 (W.E. 41,820) entitled Normalization Circuit For Position Locator by Wallace J. Hoff, filed Feb. 11, 1971 and assigned to the same assignee as the present application.

BACKGROUND OF THE INVENTION

1. Field of the Invention

In general, the present invention relates to a circuit element which will provide a predetermined output voltage in response to a predetermined input voltage. This circuit element is able to provide this function in a temperature varying environment without being affected by the variations in temperature. More specifically, it relates to a system which combines a plurality of these circuit elements to provide a predetermined non-linear function. An example of such a function is a square root function.

2. Description of the Prior Art

Non-linear function generators usually fall into two general classes: (1) those that use the continuous non-linear transfer characteristic of an active device; and (2) those that use a segmented straight-line approximation to a non-linear function by combining a series of switched linear elements.

An example of the first technique is the use of a logarithmic *V-I* (where *V* is the voltage and *I* is current) relationship of a log diode. With proper bias, the current of this diode is approximated by $$I = I_d e\,(qV)/(KT) \qquad (1)$$

where $I$ = diode current $I_d$ = is the magnitude of the reverse diffusion current $q$ = is the charge of an electron $K$ = is Boltzmann's constant $T$ = is absolute temperature $V$ = is applied voltage.

Assuming that the temperature is constant, taking the logarithm of both sides gives the logarithmic relationship:

$$1n\, I = K_1 V + K_2 \qquad (2)$$

where $$K_1 = q/(KT) \qquad K_2 = 1n\, I_d$$

A diode of this type is frequently used in conjunction with an operational amplifier as shown in FIGS. 1, 2 and 3 to give the log or antilog transfer characteristics shown.

FIG. 1 shows a circuit 5 which includes an operational amplifier 3. An input voltage, $V_{IN}$, is applied to input terminal 1. The current resulting from this input voltage, *i*, is conducted through a log diode 2 to the negative terminal of the operational amplifier 3. The circuit 5 also includes a resistor $R_{F1}$ connected from the negative terminal of the operational amplifier to its output terminal. The output voltage from the circuit 5, $V_{OUT}$ appears at output terminal 4.

Because the positive terminal of the operational amplifier 3 is connected to ground, the negative terminal will also be essentially at ground. Therefore, the magnitude of the current through resistor $R_{F1}$ is the negative of the current through the diode 2. Therefore, $$-V_{OUT}/R_f = i \text{ diode} \qquad (3)$$

From equation (2) above, $$1ni = K_1 V \qquad (4)$$

where $K_2$ has been neglected because it is very small.

From equation (4) it can be seen that $$i = \text{anti}\,1n\, K_1 V_{IN} \qquad (5)$$

Substituting equation (5) into equation (3) results in the equation $$V_{OUT} = -R_F \text{ anti}\,1n\, K_1 V_{IN} \qquad (6)$$

FIG. 2 shows another way of using a log diode. Briefly, the voltage $V_{IN}$ appearing at input terminal 6 is related to the current as follows:

$$V_{IN} = iR_{IN} \qquad (7)$$

Equation (7) reduces to $$V_{OUT} = -1/K_1\, 1n\, V_{IN}/R_{IN} \qquad (8)$$

by using equation (2) and, again, neglecting $K_2$.

In the prior art, circuit elements 5 and 10 were combined, for example, in a square root circuit as shown in FIG. 3. Assuming, for example, that a voltage $V_{IN}$ were applied at input terminal 12, the log of that voltage would appear at circuit point 14. If the voltage appearing at circuit point 14 were then directed to a voltage divider which were comprised of two resistors $R_1$ and $R_2$, of equal magnitude, the resultant output voltage at point 16 would be equal to one-half the voltage at point 14. That is, it would be equal to ½ log $1n\ V_{IN}$. Then using circuit element 10 the final output voltage at output terminal 18 would be the antilog of the voltage at circuit point 16. In other words, the voltage at output terminal 18 would be the square root of the input voltage at terminal 12.

An example of the segmented-approximation technique of non-linear function generation is the use of diodes as switching elements to switch the gain of an operational amplifier as shown in FIG. 4. As the input voltage $V_{IN}$ increases, the diodes CR1, CR2, and CR3 are progressively switched on, thereby changing the overall gain of the circuit which includes the operational amplifier 20. The points at which the subsequent diodes begin to conduct and the gains of the segment can be selected by choosing the input resistors $R_1$, $R_2$, $R_3$ and $R_4$ and the voltage E so that the shape of the transfer function can be effectively controlled. A typical result of using the segmented approach can be seen in FIG. 5 which illustrates a typical transfer function. The slope of the curve 22 changes each time a new diode begins to conduct.

However, both methods are susceptible to inaccuracies due to temperature variation because both take into account the factor $K_1$ which is a function of temperature. The non-linear element characteristics frequently vary with temperature causing, for example, the points where the diodes begin to conduct in the approximation method to change because the contact potentials of the diodes vary with temperature. As a result, both methods usually require some form of temperature compensation networks to maintain accuracy. These networks frequently act on the input voltage, varying it in a manner which cancels the temperature effect on the non-linear portion of the network.

If a number of identical non-linear networks are to be made, the temperature compensation often must be fitted to each one separately, sometimes requiring several temperature runs on each unit. Thus, in cases requiring very high accuracy (for instance, better than 1 percent) non-linear networks are very difficult and expensive to mass-produce.

BRIEF SUMMARY OF THE INVENTION

The present invention solves the temperature dependence problem by providing a plurality of circuit elements whose output voltage is not affected by temperature. Each of the circuit elements include an operational amplifier, first and second switching means in the form of diodes and impedance means. All of these component elements which make up circuit elements are connected with various signals in such a way that they allow the desired non-linear function to be shaped solely by the impedance values, completely independent of any diode temperature related characteristics. Since resistance tolerances can be easily controlled to great precision, such a network, once designed, can be readily duplicated.

In order to form the complete non-linear function generator, a plurality of the circuit elements are connected together. That is, the outputs of the plurality of circuit elements are connected to a plurality of output terminals. The means for connecting the output terminals to a common terminal includes a summing means which obtains the algebraic sum of the output signals from each of the circuit elements. In each embodiment, the gain of each operational amplifier differs from the gain of each of the other operational amplifiers.

BRIEF DESCRIPTION OF THE DRAWINGS

For a better understanding of the invention, reference may be had to the preferred embodiment, exemplary of the invention, shown in the accompanying drawings, in which.

DETAILED DESCRIPTION OF THE INVENTION

Figure 6:
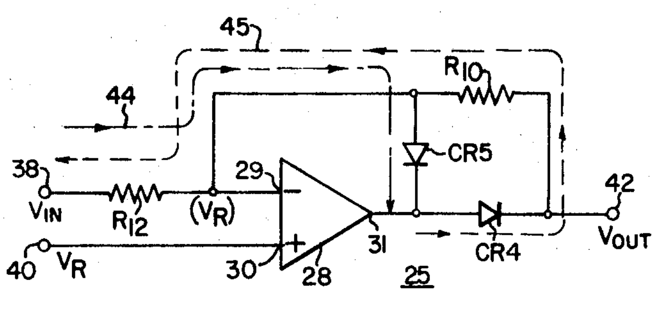
FIG. 6 is a schematic diagram of a preferred embodiment of a circuit element of the invention.

FIG. 6 shows a circuit element 25. The circuit includes an operational amplifier 28 having a first input 29, a second input 30, and an output 31. The circuit element 25 also includes a first switching means in the form of diode $CR_5$ connected between the first input 29 and the output 31. The circuit element 25 also includes a second switching means in the form of a diode $CR_4$ which is connected between the output 31 and an output terminal 42.

The circuit element 25 also includes an impedance means in the form of resistor $R_{10}$. One side of the resistor $R_{10}$ is connected to diode $CR_5$ and to the input 29. The other side of resistor $R_{10}$ is connected to diode $CR_4$ and to the output terminal 42 and additional impedance means in the form of resistor $R_{12}$ is connected into the circuit. One side of resistor $R_{12}$ is connected to input terminal 38. The other side of resistor $R_{12}$ is connected to the input 29, resistor $R_{10}$ and diode $CR_5$.

Terminal 38 is operable to receive a variable input signal. In the preferred embodiment, this input signal will be a variable voltage. As will be discussed in greater detail in FIGS. 8 and 9 below, it is the variable voltage appearing on input terminal 38 which will be transformed into a new, non-linear function. Terminal 38 is operable to connect the first signal to the first input 29 by way of resistor $R_{12}$.

Terminal 40 receives a second signal. In the preferred embodiment, the second signal is in the form of a reference voltage $V_R$. Terminal 40 is operable to connect the reference voltage to the second input 30.

In the analysis of FIG. 6 which follows, it will be assumed that no load is connected to the output terminal 42. Under such circumstances, a current will flow, due to the input voltage, $V_{IN}$, at terminal 38 through resistor $R_{12}$ and diode $CR_5$ as indicated by the dash-dot arrow 44. The circuit is completed through the operational amplifier 28 through elements which are not shown as will be understood by those skilled in the art. No current flows through resistor $R_{10}$ because diode $CR_4$ is connected in a forward direction between output 31 and output terminal 42 and because there is no load connected to the output terminal 42.

Therefore, because of the extremely high gain of the operational amplifier the voltage at input 29 will be forced to substantially the magnitude of the reference voltage $V_R$. Consequently, the voltage at the junction of resistor $R_{10}$ and diode $CR_5$ is also forced to the magnitude of the reference voltage $V_R$. Because no current flows through resistor $R_{10}$, the voltage output appearing on output terminal 42 is likewise equal to the reference voltage $V_R$. No current flows through diode $CR_4$ because it is back biased. Therefore, whenever the input voltage $V_{IN}$ is equal to or greater than the reference voltage $V_R$, the voltage appearing on output terminal 42 will be a constant voltage equal to the reference voltage $V_R$. This relationship is illustrated by curve 50 of FIG. 7. Specifically, it is illustrated by portion 50-1 of curve 50.

If the voltage applied to terminal 38 is less than the reference voltage, diode $CR_5$ is back biased and diode $CR_4$ conducts. Again, assuming that there is no load connected to output terminal 42, a feedback current will flow from the output 31 of the operational amplifier 28 through diode $CR_4$, resistor $R_{10}$, and resistor $R_{12}$. As will be understood who are familiar with the operation of operational amplifiers, no current will flow to the input 29.

Therefore, it will be understood that the magnitude of the current flowing through resistor $R_{10}$ is equal to the magnitude of the current flowing through the resistor $R_{12}$. Because the input 29 of the operational amplifier is again forced to the magnitude of the reference voltage $V_R$, the equality of the currents through the above-mentioned two resistors can be written as $$(V_{OUT}-V_R)/R_{10}=(V_R-V_{IN})/R_{12} \quad (9)$$

Figure 7:
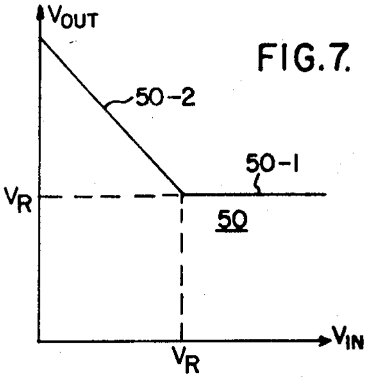
FIG. 7 is a graph illustrating the transfer characteristics of the circuit shown in FIG. 6.

Therefore, when the input voltage is less than the reference voltage, the voltage at the output terminal 42 will vary at a slope which is determined by the ratio of resistor $R_{10}$ to resistor $R_{12}$. The absolute magnitude, however, will also be dependent upon the magnitude of the input voltage. The transfer characteristics for the circuit elements 25 when the input voltage is less than the reference voltage is illustrated in section 50-2 of curve 50 which is shown in FIG. 7.

Since the diodes are inside the operational amplifier feedback loop, the transfer characteristics depends only on the resistance ratio and the reference voltage $V_R$, and not on the diode characteristics. If the outputs of a number of the circuit elements 25 are added together, any shape function can be obtained. This is illustrated in FIG. 8.

Figure 8:
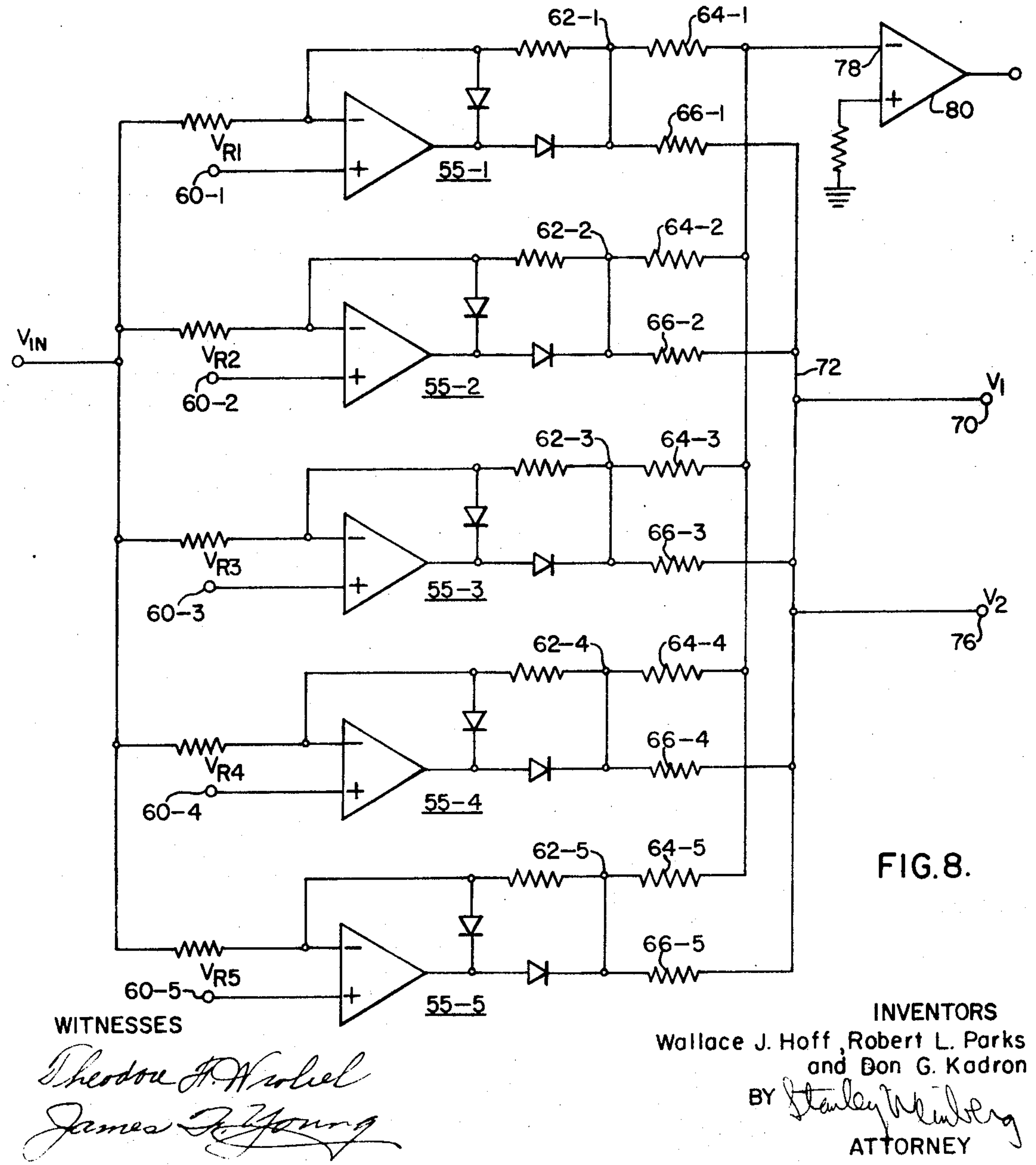
FIG. 8 is a circuit diagram of a non-linear function generator utilizing the circuit element of FIG. 6.

FIG. 8 shows a plurality of circuit elements 55-1, 55-2, 55-3, 55-4, and 55-5. Each of the elements are similar to element 25 discussed above with respect to FIG. 6. Although five such elements are shown in FIG. 8, it will be understood that a greater or smaller number of such elements could be used depending upon the resolution desired. Terminal 58 connects the input voltage to the negative input of each of the operational amplifiers of each circuit element. In an operative embodiment, the closed loop gain of each operational amplifier is not the same. However, another embodiment may require that two or more be equal.

Terminals 60-1, 60-2, 60-3, 60-4 and 60-5 connect a plurality of second signals to the respective positive inputs of the operational amplifiers. These second signals are reference voltages. In an operative embodiment, the magnitude of the voltage $V_{R1}$, applied at terminal 60-1, is the largest of all the reference voltages. Progressively smaller voltages are selected for connection to the other reference terminals. However, it will be understood that the magnitudes of the reference voltages could be arranged in any order depending upon the function generated and its particular design requirements.

The output terminals for the respective circuit elements are 62-1, 62-2, 62-3, 62-4 and 62-5. Two additional resistors are connected to the output terminal of each circuit element. Referring briefly to FIG. 6, it will be remembered that circuit element 25 was analyzed for the case where it was assumed that no load was connected to the output terminal 42. In the embodiment of FIG. 8, a load is, in fact, connected to each of the output terminals. Because a load is connected, the current equations which were used to analyze FIG. 6 must be modified for purposes of FIG. 8 because, now, a current will flow through each of the output terminals.

The effect of a current flowing through each of the output terminals is that the output voltage at the respective output terminals (for example, output terminal 62-1) will be less than it should be. This is especially critical during that portion of operation when the input voltage is greater than the reference voltage. In order to compensate for the drop in output voltage, a voltage $V_1$ is applied to terminal 70 from which it is conducted to line 72 which, in turn, conducts it to respective ones of compensating resistors 66-1, 66-2, 66-3, 66-4 and 66-5. Depending upon the function which is being generated, it is most likely that in an operative embodiment, the magnitudes of each of the compensating resistors will be different because, of necessity, the desired output voltages at the respective output terminals will also be different.

The output voltages from each of the respective output terminals are directed through a connecting means which connect the output voltages to a common terminal 78 of operational amplifier 80. The aforementioned connecting means is a summing circuit which includes a plurality of additional impedance means in the form of resistors 64-1, 64-2, 64-3, 64-4 and 64-5. These additional resistor means are each respectively connected to respective output terminals and to the common input terminal 78 of operational amplifier 80. Their function is to provide an algebraic sum of all of the output voltages appearing at the respective output terminals of all of the circuit elements.

Figure 1:
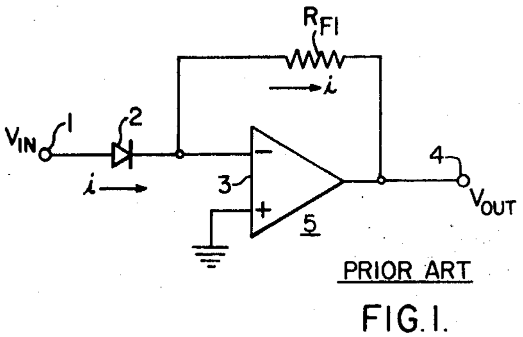
PRIOR ART FIG. 1.
FIGS. 1, 2, 3 and 4 are circuit diagrams showing prior art circuit.
Figure 2:
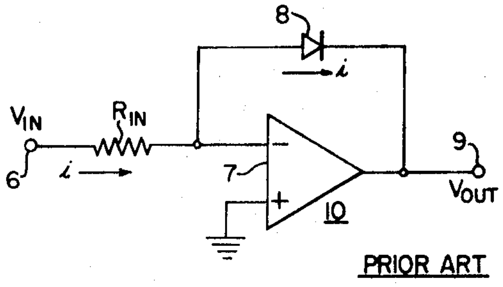
PRIOR ART FIG. 2.
Figure 3:
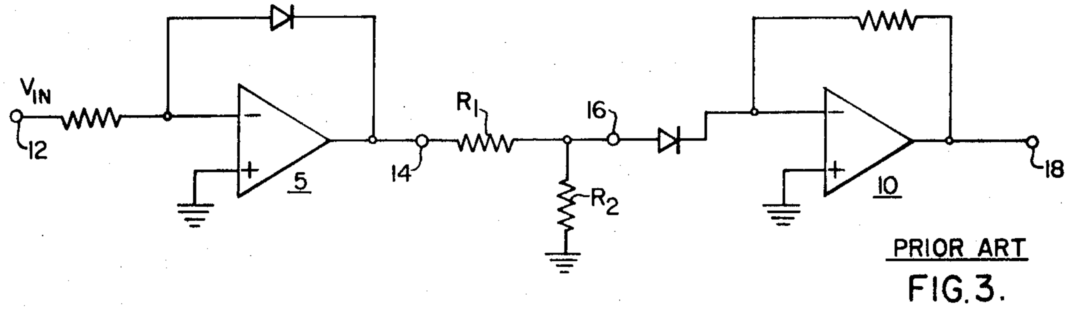
PRIOR ART FIG. 3.
Figures 4, 9:
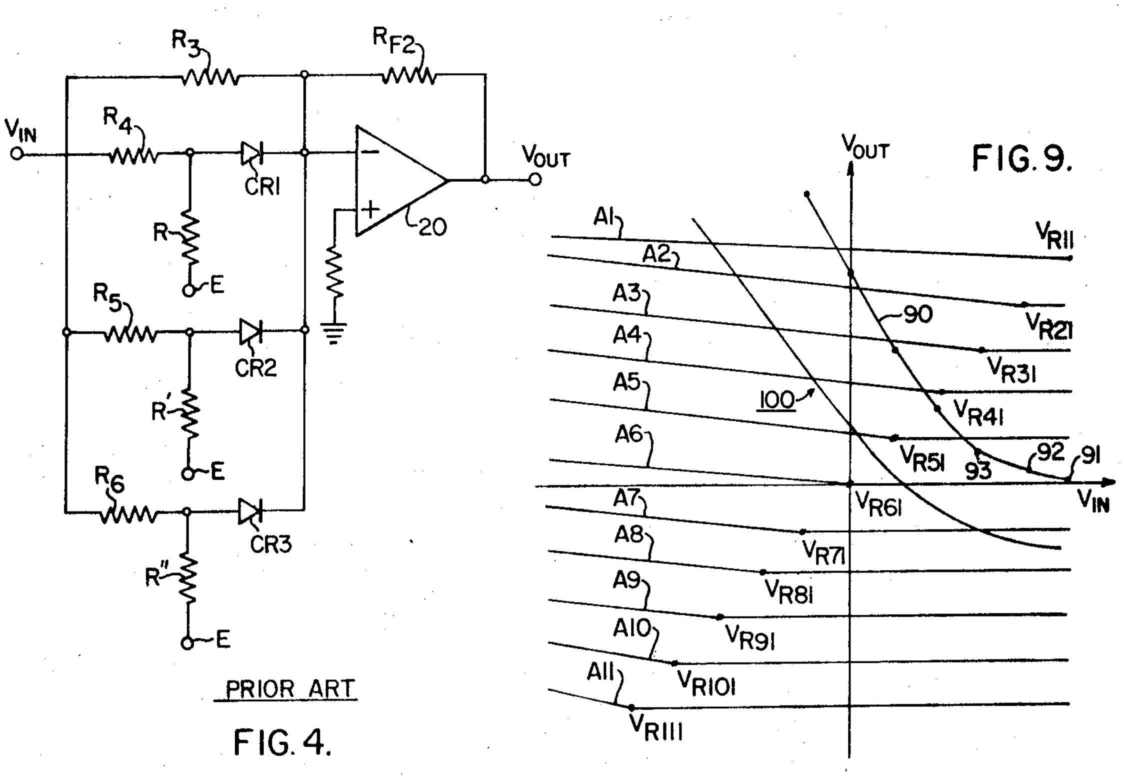
FIG. 9 is a circuit diagram of an alternative embodiment of a non-linear function generator using a modified circuit element.

FIG. 9 graphically illustrates the summation operation of circuitry similar to that described in FIG. 8. The graph of FIG. 9 represents a non-linear function which might be derived using 11 circuit elements. Lines A1 to A11 represent the transfer characteristics for each of the respective circuit elements. In the example illustrated in FIG. 9, the circuit elements would have been designed in such a way that the voltage magnitude represented by the horizontal portion of transfer characteristic curve A5 was equal in magnitude but opposite in sign to the voltage magnitude represented by the horizontal portion of transfer characteristic curve A7. Similarly, the voltage magnitude represented by the horizontal portion of curve A4 is equal in magnitude but opposite in sign to the voltage magnitude represented by the horizontal portion of curve A8. Likewise, the voltage magnitudes of the horizontal portions of curves A3 and A9, A2 and A10, and A1 and A11 have been matched.

If, for example, the input voltage is at a reference voltage $V_{R11}$ volts, the circuit elements are designed to provide point 91 of the curve 90. Point 91 results because all of the voltage outputs of the circuit elements are summed together to equal a zero volt output. Of course, it will be understood that the sum of the circuit elements need not be arranged to provide a zero output voltage under similar circumstances. It would depend upon the particular application to which the circuit is put. When the input voltage decreases to the point where it equals reference voltage $V_{R21}$, the summation of the output voltages, this time, provides point 92 on curve 90. Similarly, when the input voltage decreases to the magnitude of the reference voltage $V_{R31}$, the summation operation results in point 93 on curve 90. Similar operations will occur as the input voltage decreases.

Referring again to FIG. 8, an additional voltage, $V_2$, is connected to line 78 by way of terminal 76. This voltage is thereby connected to one end of the summing resistors and to the input 78. The voltage $V_2$ permits the entire transfer function of the system to be raised or lowered depending upon the final output voltage which is desired from the operational amplifier 80. For example, assume that curve 90 of FIG. 9 resulted from the circuit of FIG. 8 without the voltage $V_2$. However, assume also that the resultant voltages on the curve were too high for use by the rest of the circuit. By using the compensating voltage $V_2$, the level of the entire curve 90 can be shifted downward so that it now becomes curve 100 the voltages of which are compatible with the remainder of the circuit.

Figures 5, 10:
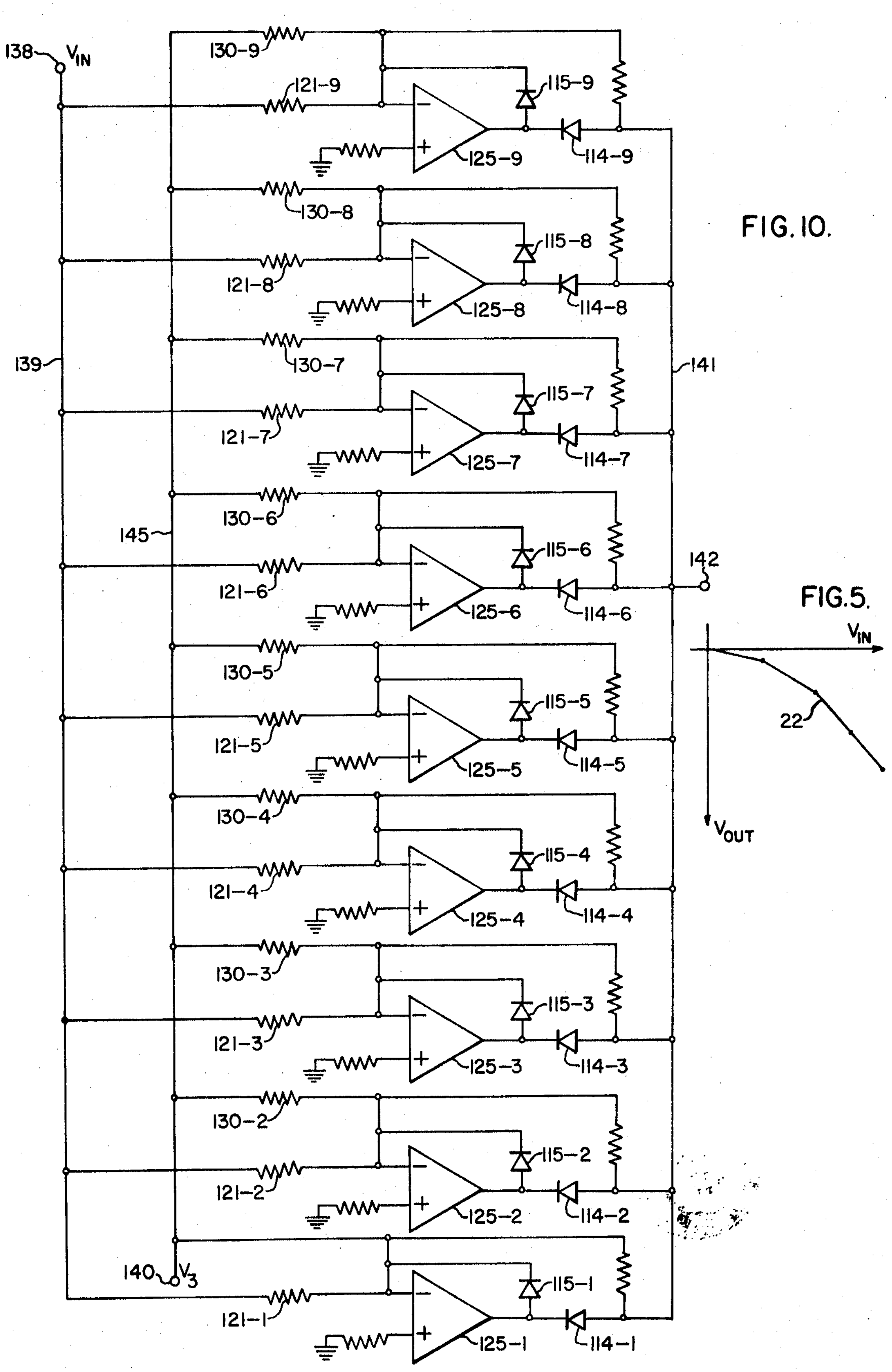
FIG. 5 is a graph illustrating the operation of the prior art device shown in FIG. 4.

FIG. 10 shows an alternative embodiment of the invention. Instead of summing up the output from each of the circuit segments, the outputs of the operational amplifiers of FIG. 10 are arranged in a peak selector configuration so that only the largest signal is present at the output while all the others are biased off. As a result, the slope of each circuit element is determined by a single operational amplifier.

In FIG. 10, the input voltage is connected to terminal 138 and is conducted over line 139 to one of the input terminals of each of the operational amplifiers. The closed loop gains of each of the respective operational amplifiers 125-1 to 125-9 are selected to sequentially, progressively increase. Each circuit element also includes respective ones of diodes 114-1 to 114-9 and also respective ones of diodes 115-1 to 115-9. The output terminals of each circuit element are connected through line 141 and thence to terminal 142. The input voltage is connected to the respective input terminals of the operational amplifiers through resistors 121-1 to 121-9. These latter resistors help to determine the gain of each of the respective operational amplifiers. An additional voltage $V_3$ is connected to terminal 140 and then over line 145 to each of the respective negative input of each operational amplifier. Connected between the line 145 and each of the negative inputs of each operational amplifier are respective resistors 130-2 to 130-9. The magnitudes of the resistors progressively decrease from 130-2 to 130-9. In addition, a plurality of respective reference voltages are connected to the positive terminals of each of the operational amplifiers.

Referring to operational amplifier 125-1, for example, assume, for the moment, that the input voltage applied to its negative input terminal is greater than the reference voltage applied to its positive terminal. Each of the operational amplifiers 125-1 to 125-9 are inverting amplifiers. As a result, a high positive voltage will appear at the junction of diodes 114-1 and 115-1. This high positive voltage will forward bias diode 115-1 but will be unable to be conducted through diode 114-1.

When the input voltage is such that the voltage appearing at the negative terminal is less than the voltage appearing at the positive terminal, a negative voltage will appear at the junction of diodes 114-1 and 115-1. As a result, diode 115-1 will be back biased but diode 114-1 will conduct its voltage to line 141 and thence to output terminal 142. Even though diode 114-1 is conducting, the remaining circuits are designed in such a way that diodes 114-2 to 114-9 do not conduct.

The non-conducting mode of diode 114-2 to 114-9 is accomplished by providing the voltage $V_3$ as an offsetting voltage. If, for example, a positive voltage is being fed into terminal 138, a negative voltage will be applied to terminal 140. Therefore, before operational amplifier 125-2 can provide the requisite negative voltage at the junction of diodes 114-2 and 115-2 to enable diode 114-2 to conduct, the input voltage must overcome the magnitude of the offsetting voltage as it appears at the negative terminal of operational amplifier 125-2. Just at the point where the input voltage overcomes the offsetting voltage at the negative input of operational amplifier 125-2 the voltage output from operational amplifier 125-2 is substantially equal to the output voltage of operational amplifier 125-1. As the input voltage increases slightly above this magnitude, the greater gain of operational amplifier 125-2 will cause a negative voltage to appear at the junction of 114-2 and diode 115-2. This greater voltage will then appear on line 141. Therefore, because the voltage on the anode side of diode 114-1 is greater than the voltage appearing on the cathode side of diode 114-1, diode 114-1 will be back biased and, therefore, will be cut-off. Therefore, only operational amplifier 125-2 will be providing an output to line 141 and, therefore, output terminal 142.

Similarly, the gain of the operational amplifier 125-3 and the magnitude of the resistor 130-3 is chosen so that the diode 114-3 will provide an output on line 141 just as the diode 114-2 is cut-off. Consequently, the magnitude of resistor 130-3 is smaller than the magnitude of resistor 130-2. Once the shape of the desired function is decided upon, it will be understood that the magnitudes of the operational amplifiers and the associated resistors will be chosen in such a manner, by trial and error, that the output voltage on terminal 142 will follow the desired path.

We claim as our invention:

1. In combination, a plurality of operational amplifiers each having a first input,
   a second input and an output;
   a plurality of first switching means;
   a plurality of second switching means;
   means for connecting a first signal to the first input of each of said plurality of operational amplifiers;
   means for connecting respective ones of a plurality of second signals to respective ones of said second inputs of said plurality of operational amplifiers;
   means for connecting a plurality of offsetting third signals to respective ones of said first inputs of said plurality of operational amplifiers;
   a plurality of output terminals for providing a plurality of output signals;
   common terminal means connected to said plurality of output terminals for receiving said plurality of output signals;
   means for connecting respective ones of said plurality of first switching means between the first input and the output of respective ones of said operational amplifiers;
   means for connecting respective ones of said plurality of second switching means between the outputs of respective ones of said operational amplifiers and respective ones of said output terminals;
   a plurality of first impedance means, respective ones of said impedance means being operably connected to respective ones of said first and second switching means for determining the output signals at said output terminals; and
   wherein said second switching means is responsive to said first, second, and third signal means such that only one of said second switching means is conductive at any given time.

2. The combination of claim 1 wherein at least two of said operational amplifiers have gains which differ one from the gain of the other.

3. The combination of claim 2 wherein said means for connecting a plurality of offsetting third signals to respective ones of said first inputs include a plurality of second impedance means.

4. The combination of claim 3 wherein at least two of said plurality of second impedance means differ one from the other.

* * * * *